United States Patent [19]

Faul et al.

[11] 4,432,872
[45] Feb. 21, 1984

[54] APPARATUS FOR OXIDATION OR REDUCTION PROCESS IN WATER SOLUTION WITH ELECTROCHEMICALLY ACTIVE CATALYST ON A POROUS CARRIER

[75] Inventors: Wolfgang Faul, Jülich; Bertel Kastening, Hamburg, both of Fed. Rep. of Germany

[73] Assignee: Kernforschungsanlage Jülich GmbH, Jülich, Fed. Rep. of Germany

[21] Appl. No.: 274,622

[22] Filed: Jun. 17, 1981

[30] Foreign Application Priority Data

Jun. 25, 1980 [DE] Fed. Rep. of Germany ....... 3023703

[51] Int. Cl.³ .............................................. B01J 8/06
[52] U.S. Cl. ................................................... 210/205
[58] Field of Search ................ 204/149, 302; 210/763, 210/205, 209, 218, 220, 221.1, 221.2, 447, 483, 496, 497.01, 502–504, 506, 510, 243; 252/425.3, 447

[56] References Cited

U.S. PATENT DOCUMENTS

| | | | |
|---|---|---|---|
| 3,396,123 | 8/1968 | Urban | 210/504 |
| 3,433,358 | 3/1969 | Herzog et al. | 210/502 |
| 3,933,643 | 1/1976 | Colvin et al. | 210/504 |
| 3,950,251 | 4/1976 | Hiller | 210/447 |
| 4,013,554 | 3/1977 | Reis et al. | 210/502 |
| 4,159,309 | 6/1979 | Faul et al. | 423/53 |

OTHER PUBLICATIONS

"Technische Information" Nr. 17, 1978, Katalytische Metall-Rückgewinnung aus wässrigen Lösungen.

*Primary Examiner*—Ivars C. Cintins
*Attorney, Agent, or Firm*—Frishauf, Holtz, Goodman & Woodward

[57] ABSTRACT

A plate or hollow cylinder of coarsely porous graphite is coated with a layer of finely porous activated carbon that has previously been heat-treated. The fine layer is impregnated with a catalyst either before or after application to the graphite body. A gas is caused to flow through the graphite body and out through the finely porous layer containing the catalyst, to react with substances in a solution in which the carrier body is immersed. For oxidation, air can be used, and for reduction, hydrogen. In this manner, sulfite can be oxidized or chromate reduced and hydrogen gas can also be used to precipitate platinum, rhodium, copper and other metals from solution. Electro-chemical activation or regeneration of the catalyst is possible by applying a potential to the carrier body. The reaction can be carried on in solutions in which solids are suspended without clogging the catalyst.

4 Claims, 1 Drawing Figure

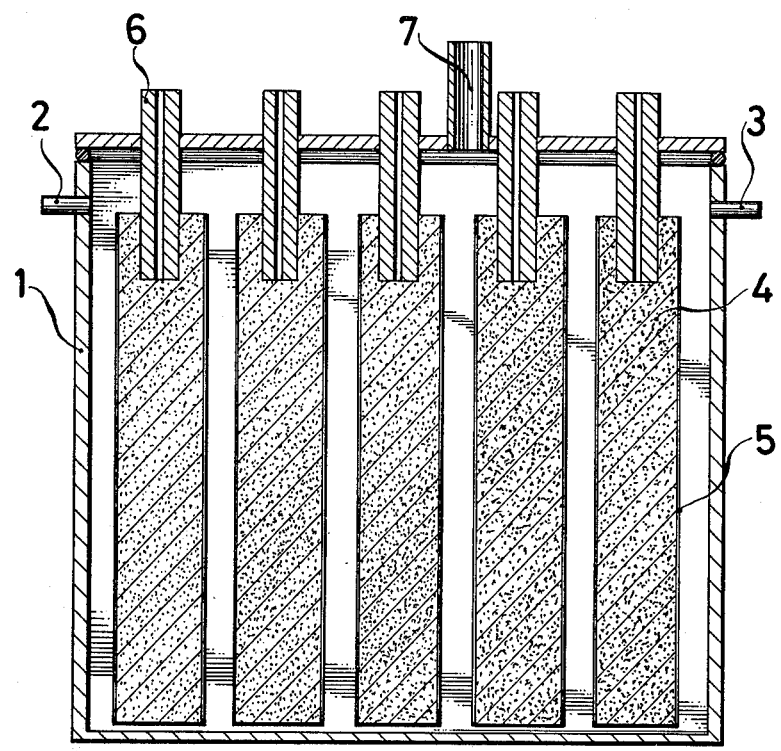

APPARATUS FOR OXIDATION OR REDUCTION PROCESS IN WATER SOLUTION WITH ELECTROCHEMICALLY ACTIVE CATALYST ON A POROUS CARRIER

This invention concerns apparatus for oxidation or reduction of materials in water solution by means of an electrochemically active catalyst applied to a porous carrier material. The material is brought into contact with the catalyst with either an oxidizing agent or a reducing agent suitable for reacting with the material in solution, the oxidizing or reducing agent being introduced into the solution through the porous carrier material. The invention also concerns a carrier body for the catalyst by carrying out such an oxidation or reduction process and also a method for producing the coating material that contains the catalyst and is applied to the carrier body.

It is known to eliminate polluting materials in water solution by oxidation or reduction. Such processes serve for example for the purification of waste water of which the pollutant content is to be limited to low values because the toxic effect of the pollutants contained therein. The detoxification of solutions containing cyanide or sulfite in the presence of oxygen and in contact with activated carbon as a catalyst or with the use of electrode material from fuel cells provided therein as a catalyst is described in German-published patent applications (AS) Nos. 27 14 075 and 27 13 991. A catalytic reduction of chromate is given in German-published patent application (AS) No. 27 14 074.

A reduction process for precipitating metals contained in water solution as metallic ions is known from German Pat. No. 27 17 368. In the two last-mentioned cases, there are used as catalysts, for example, materials that are suited for the electrochemical oxidation of hydrogen.

In a publication of Kernforschungsanlage Jülich GmbH entitled "Technische Informationen Nr. 17," of April 1978, a hollow cylinder of porous carbon or graphite is shown as a catalyst carrier for catalytic recovery of metals from water solution. The hollow cylinder is impregnated with platinum as catalyst and dips into a metal-containing solution. In the interior of the cylinder, hydrogen is introduced under pressure as reducing agent, the hydrogen penetrates through the impregnated hollow cylinder and has the effect, along with the oxidation of the hydrogen, that the metal ions contained in the solution are reduced at the catalyst and are precipitated as metal.

Disadvantages appear in these known processes when suspended material or other solids are contained in the solutions to be treated and clog the catalyst. It is also difficult to recover the precipated metal quantitatively from the hollow cylinder without, at the same time, destroying the cylinder.

THE INVENTION

It is an object of the invention to provide a process for oxidation or reduction of materials in water solution which are oxidizable or reducible that provides an adequate conversion and a high yield even in solutions which contains suspended material or other solids contaminating the solution. It is a further object of the invention that if metal is deposited on the catalyst carrier, it should be recoverable in a simple way.

Briefly, a coarsely porous carrier body is used for the catalyst that has a finely porous layer, containing the catalyst, on its surface facing the aqueous solution. This layer is permeable just as the carrier body is for the oxidizing or reducing gaseous agent to be introduced into the solution. Such a constitution of the carrier provides a highly uniform feeding through and distribution of gas over the surface of the coated carrier body even when there are locally varying amounts of hydrostatic pressure as is the case, for example, in a carrier body dipped perpendicularly into the aqueous solution.

It is also advantageous that metals recoverable from an aqueous solution with the introduction of a reducing agent into the solution precipitate only on the layer containing the catalyst and are thus recoverable in a simple fashion. It has moreover been found that the provision of the catalyst in a finely porous layer mitigates the impairment of the catalyst resulting in the presence of catalyst poisons in the solution. Coated carrier bodies according to the invention have longer service lives than carrier bodies impregnated with catalyst as heretofore known.

As meterials for the carrier body, there come into consideration the usual porous materials permeable by liquids or gases such as are known, for example, for use as filter plates. On such carrier bodies of carbon or of ceramic material, layers of finely porous structure are provided. The catalyst can be already contained in the mass to be applied to form this layer or it can later be applied to the layer. Preferably, the coating of the carrier body is an activated carbon that has been calcined for an hour at 1100° C. in a hydrogen atmosphere. More generally, the temperature of calcination should be between 950° and 1200° C. and the duration thereof should be at least 45 minutes, the period being desirably longer for the lower end of the temperature range.

In the case of a deposition from water solution of containing metals that are themselves catalytic for the oxidation of hydrogen, the finely porous layer on the carrier body desirably contains, as catalyst, the same metal that is to be deposited. Thus it is, for example, advantageous in the recovery of platinum from aqueous solution to utilize platinum also as the catalyst in the finely porous layer. The same holds for the recovery of rhodium or gold, in which cases rhodium or gold are respectively used as the catalyst.

As a further development of the invention, the carrier body can be made of electrically conductive material and a connection can be provided on the carrier body for connecting the source of electrical voltage. This makes possible an electro-chemical activation of the catalytically active layer, especially an electrochemical regeneration of the coated carrier body, in particular for the case of precipitation of a metal from solution.

For the preparation of the coating material for a carrier body, the activated carbon powder calcined at a temperature above 1000° C. for at least 45 minutes, preferably for an hour, is suspended in a solution containing a catalyst. The activated carbon powder is then filtered after absorption of the catalyst, then dried and treated in a reducing atmosphere at 300° C. for at least 45 minutes and preferably about one hour. Thereafter the activated carbon powder is again suspended in a solution suitable for forming a layer on the carrier body. Very finely porous thin layers can be provided on the carrier body with the type of material just described. An advantage of such finely porous layers is the uniformity with which the reducing or oxidizing agent penetrates such a layer and also the high rate of conversion per surface area produced in this manner.

EXAMPLES AND DRAWING

The invention is further described by way of specific examples with reference to the annexed drawing, of which the single FIGURE illustrates a carrier body coated with a layer having fine pores carrying the catalyst and forming part of an installation for catalytic oxidation or reduction of materials in water solution, shown schematically in cross-section.

DESCRIPTION OF THE EXAMPLES

The drawing shows a container 1 in which an aqueous solution, containing either polluting substances or recoverable metals, can be introduced by the inlet pipe 2. The liquid level in the container 1 is determined by an overflow 3 where the purified liquid is discharged. Carrier bodies 4 of porous material are disposed in the container as shown in the drawing. The carrier bodies are fully immersed in the solution and have a layer 5 impregnated with a catalyst on their surfaces which face the solution. Platinum, rhodium, tungsten carbide and gold are suitable catalysts. The catalyst provided in the particular case is selected in accordance with the metal to be recovered.

In the illustrated installation the carrier bodies 4 are made in plate shape. At one of the narrow sides of the carrier body there is in each case a reagent duct 6 set in a cavity provided therefor at the top for an oxidizing or reducing agent in fluid form. The introduced reagent permeates the porous carrier body 4 and the finely porous layer 5 and reacts in the presence of the catalyst with the materials contained in the water solution. Oxygen or oxygen-containing gases are supplied through the reagent duct 6 into the carrier body 4 for the oxidization of oxidizable materials; whereas, for the reduction of reducible materials, hydrogen or hydrogen-containing gases are introduced.

In the case of gases, the pressure in the reagent duct 6 is conveniently so set, that a more than stoichiometric quantity of gas flows into the solution. This leads to a better mixing up of the solution in the region of the catalytically active surface of the carrier body, thus making possible a high rate of conversion. On account of the increased flow resistance of the finely porous layer 5 compared to the coarsely porous material of the porous carrier body 4, the gas proceeds uniformly out through the entire plate surface, in spite of the hydrostatic pressure difference across the plate height of the carrier body immersed in the solution.

The excess quantity of gas rises in the solution and is drawn away out of the container 1 through an exit pipe 7. It is convenient to recirculate the amount of gas not needed in any one pass back to the reagent duct 6, a procedure that is of particular economic significance in the use of hydrogen or hydrogen-containing gases.

Instead of plate-shaped carrier bodies, carrier bodies of the shape of a cylinder or a polyhedron can also be used, in each case with a feed duct for an oxidizing or reducing agent leading into the interior of the body.

EXAMPLE 1

A plate of commercial grade porous graphite with dimensions of $100\times100\times20$ mm$^3$ was coated on its surface with 10 mg of coating material per 1 cm$^2$. For manufacture of the coating material, activated carbon powder was calcined at 1100° C. in a hydrogen atmosphere for an hour and, after cooling, was suspended in a platinum-containing solution. The platinum content of the solution was so set that the activated carbon powder had a platinum content of 2% by weight after complete adsorption of platinum. The activated carbon powder was filtered, dried and exposed for another hour at 300° C. to a stream of hydrogen. The activated carbon powder was then suspended in a solution of natural rubber in toluol and stirred until it became a mass that could be painted or spread, in which mass every gram of carbon powder containing catalyst was mixed with 20 ml of toluol containing 0.125 g of dissolved caoutchouc. The mass thus obtained was then spread on the carrier body in such a quantity that after drying 10 mg of catalyst was present on each 1 cm$^2$ of surface.

A cavity of 10 mm diameter and 20 mm length was provided on one of the narrow sides of the plate-shaped carrier body for connection of a reagent duct.

The carrier body was immersed in a cell which contained a weakly acidic solution having a pH value of 2 and a chromate content corresponding to 0.5 g of chromium per liter. The carrier body was then permeated with hydrogen fed through it at the rate of 0.5 liter per hour. The chromate of the solution was reduced at the carrier body to chromium (III) ions. With a throughput of 500 ml of solution per hour, at the overflow of the cell only a chromate content of less than 0.1 mg per liter could be detected.

EXAMPLE 2

A plate of $250\times250\times20$ mm$^3$ of commercial-grade porous graphite was coated with a layer of activated carbon that contained no platinum but otherwise corresponded to the coating material of Example 1. The carrier body made from the plate was connected to reagent ducts and also connected electrically by connections not shown in the drawing to a voltage source. The carrier body was immersed in a platinum-containing solution. At a current density of 5 mA/cm$^2$ of surface, platinum was deposited in a quantity of 0.5 mg/cm$^2$ of plate surface.

The carrier body was immersed in the chromate-containing solution described in Example 1. At a throughput of 3 liters of solution per hour, the chromate of a solution at the overflow could be reduced below 0.1 mg per liter.

EXAMPLE 3

A plate of commercial-grade porous graphite with dimensions of $100\times100\times20$ mm$^3$ was coated with activated carbon as in Example 2, the carbon in this case being calcined at 1000° C. for an hour in a hydrogen atmosphere beforehand. The plate was dipped into a platinum-containing solution for impregnation with platinum. The plate was then permeated with hydrogen gas and in that process step the platinum was deposited on the surface of the activated carbon layer containing 0.5 mg of platinum per cm$^2$.

A carrier body produced from this plate was used in a cell for reduction of chromate in a solution such as was described in Example 1. With the passage of 800 ml of solution per hour through the cell, a chromate content at the overflow of less than 0.1 mg per liter could be obtained.

EXAMPLE 4

A plate of commercial-grade porous graphite of circular contour with a 3 cm diameter and a thickness of 3 mm used as the carrier body and coated on one side with a catalyst corresponding to Example 1. The coated surface of the carrier body was then immersed in a solution containing copper sulfate with a content of 1 g of copper per liter and was supplied with hydrogen gas from its uncoated side. On the coated surface of the carrier body, the copper was continuously deposited. After the depositing of 2 g of copper per $cm^2$ on the surface, the rate of deposition was still more than 50% of the initial rate of deposition.

EXAMPLE 5

A carrier body made as in Example 4 of commercial-grade porous graphite, with a diameter of 10 cm this time and a thickness of 5 mm was coated on one side with catalyst in the manner described in Example 1. It was immersed in a solution containing 1 g of rhodium per liter and was subjected to a flowthrough of hydrogen gas as in Example 4.

After six hours of treatment 200 ml of solution was reduced in rhodium content to a concentration of 50 mg of rhodium per liter. The rest of the metal had been deposited on the activated carbon surface of the carrier body.

EXAMPLE 6

A porous graphite plate of circular contour having a diameter of 10 cm and a thickness of 5 mm was coated in accordance with the procedure of Examples 4 and 5, immersed in a weakly acidic solution containing 1 g of chromate and 0.1 g of copper per liter, and then was fed with hydrogen gas from the rear side. In the course of this treatment, at the same time, Cr(VI) ions were reduced to CR(III) ions and metallic copper was deposited on the surface. For a final concentration of less than 0.1 mg per liter for the components of the solution, 300 ml of solution per hour could be converted at the carrier body.

EXAMPLE 7

A carrier body in the form of a hollow cylinder and made of porous ceramic material of a kind commercially used for ceramic filters, having an outer diameter of 47 mm, an inner diameter of 20 mm, and length of 135 mm was coated with an activated carbon layer containing platinum in accordance with Example 1, except that for the provision of the coating material commercial grade activated carbon powder activated in steam at 1000° C. was used.

The carrier body was immersed in a solution containing chromate as described in Example 1 and was subjected to a permeating flow of hydrogen gas from its inner side. With a throughput of 500 ml of solution per hour, the chromate content of the solution could be lowered below 0.1 mg per liter.

EXAMPLE 8

Carrier bodies of square plates of commercial-grade porous graphite with dimensions of 110×110×20 $mm^3$ were coated in accordance with Example 7. Carrier bodies were immersed in a solution that contained sodium sulfite at a concentration of 10 g per liter that had been set at a pH value of 12 with sodium hydroxide. All carrier bodies were subjected to a permeating flow of air. In one hour the sodium sulfite concentration of the solution could be reduced by 20% if 3 $cm^3$ of solution were treated per $cm^2$ of carrier body surface.

EXAMPLE 9

A carrier body of porous graphite as in Example 8 was immersed in a solution that contained 50 g of sodium sulfite per liter and was then subjected to a through-flow of air. The solution in this case was set at a pH value of 12 in the same was as in Example 8. By treating 3 $cm^3$ of solution per $cm^2$ of plate surface, the sodium sulfite concentration after about 3 hours could be reduced to 50% of the initial value.

EXAMPLE 10

A carrier body of porous graphite as in Example 8 was immersed in a solution that contained 50 g of sodium sulfite and had been set at a pH value of 6. With subjection of the carrier body to a through-flow of air, the treatment of 3 $cm^3$ of solution per $cm^2$ of plate surface serves to drop the sodium sulfite of the solution in one hour by 22%.

EXAMPLE 11

A plate of commercial-grade porous graphite of circular contour with a diameter of 2 cm and a thickness of 3 mm was, as a carrier body, coated on one of its sides with 10 mg of coating material per $cm^2$ of surface in accordance with Example 1. An electrical contact for connection to a voltage source was applied to the carrier body. The coated side of the carrier body was immersed in a 0.1 molar solution of sulfonic acid which was at room temperature and the carrier was supplied with hydrogen from its uncoated side.

The rate of the anodic oxidation of hydrogen in the catalytically active surface layer of the carrier body was determined as a function of the electrode potential measured versus a mercury sulfate reference electrode. At a potential of −400 millivolts relative to the reference electrode, the current of the anodic hydrogen oxidation was 15 milliamperes.

While maintaining the hydrogen through-flow, the carrier body was brought to a potential of 200 millivolts relative to the reference electrode by connecting the electrical contact of the plate to another voltage source. After this anodic activation of the catalytically active layer of the carrier body, the current for the anodic hydrogen oxidation at a potential of −400 millivolts relative to the reference electrode was about 150 milliamperes. With electro-chemical activation, the catalytically active layer could thus increase the hydrogen oxidation under the above-given conditions to 10 fold the value without anodic activation.

EXAMPLE 12

A plate of commercial-grade porous graphite of circular contour with a diameter of 2 cm and a thickness of 3 mm which has been coated with catalyst in accordance with FIG. 1 was immersed at room temperature with its coated side in a 0.1 molar sulfuric acid solution with a copper content of 0.5 g per liter, with the result that metallic copper was deposited up to an amount of 100 mg per $cm^2$ of plate surface. The current for the anodic hydrogen oxidation at a potential of −500 millivolts measured relative to a mercury sulfate reference electrode was at the beginning of copper deposition of a strength of 105 milliamperes and, after copper deposition, 95 milliamperes.

For electro-chemical regeneration of the carrier body, the latter was placed in a solution with good electrical conductivity, in a particular example, in a 1 molar solution of sulfuric acid and connected by means of an electrical contact of the plate and a connection to a voltage source put at a potential of 0 millivolt difference with reference to the aforesaid reference electrode. The copper was anodically dissolved at the carrier body and redeposited on a copper cathode. After this regeneration of the carrier body, the current for the anodic oxidation at a potential of −500 millivolts measured relative to the reference electrode, was again 100 milliamperes.

Although the invention has been described with reference to particular illustrative examples, it will be understood that variations and modifications are possible within the inventive concept.

The solutions containing platinum, rhodium, or copper mentioned above are, of course, solutions of salts of the metals in question. A platinum salt adsorbed from solution on carbon should be regarded as a precursor of a catalyst although it is lumped into the concept of "catalyst" in the foregoing specification. The catalyst proper is the finely divided metal produced by heating the impregnated carbon in hydrogen.

We claim:

1. A catalysis apparatus for maintaining a catalytic reaction of a gaseous oxidizing or reducing agent with a substance dissolved in water by means of a catalyst and catalyst carrier immersed in said water, comprising:

a supporting core of porous material selected from the group consisting of ceramic materials and structurally firm materials composed principally of carbon particles;

a surface layer of porous activated carbon holding therein a finely divided metallic catalyst material, which layer is more finely porous than said supporting core and sufficiently coherent to remain in place while exposed to surrounding water while said gaseous reagent passes outward therethrough;

means for holding said core, with said layer thereon, substantially immersed in an aqueous solution, and means for causing a gaseous oxidizing or reducing agent to enter said core without first passing through said layer and to exit from said core through said layer into said aqueous solution when said core is immersed therein.

2. A catalyst carrier as defined in claim 1, in which said catalyst-holding activated carbon of said surface layer is the product of calcining activated carbon powder in a hydrogen atmosphere at 1100° C. for at least about one hour and, after cooling, impregnating the calcined powder with said catalyst or a precursor thereof.

3. A catalyst carrier as defined in claim 2, in which said finely divided metal catalyst held in said layer on said carrier is a metal of which ions are contained in said aqueous solution.

4. A catalyst carrier as defined in claim 1, 2 or 3, in which said core is electrically conductive and an electrical contact and connection thereto is provided for connecting said core to a source of voltage.

* * * * *